April 25, 1933.   C. BIRDSEYE ET AL   1,905,131
REFRIGERATING APPARATUS
Filed Feb. 25, 1931   3 Sheets-Sheet 1

Inventor
Clarence Birdseye
and Bicknell Hall
by Henway & Witter
Attorneys

April 25, 1933.  C. BIRDSEYE ET AL  1,905,131
REFRIGERATING APPARATUS
Filed Feb. 25, 1931  3 Sheets-Sheet 2
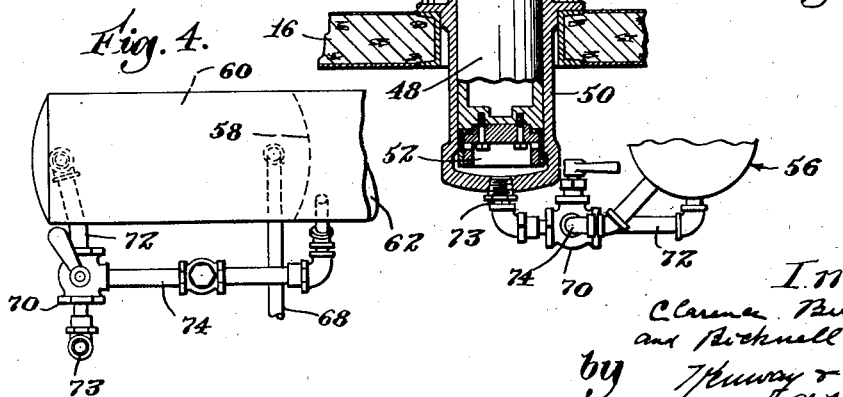

April 25, 1933. C. BIRDSEYE ET AL 1,905,131
REFRIGERATING APPARATUS
Filed Feb. 25, 1931  3 Sheets-Sheet 3
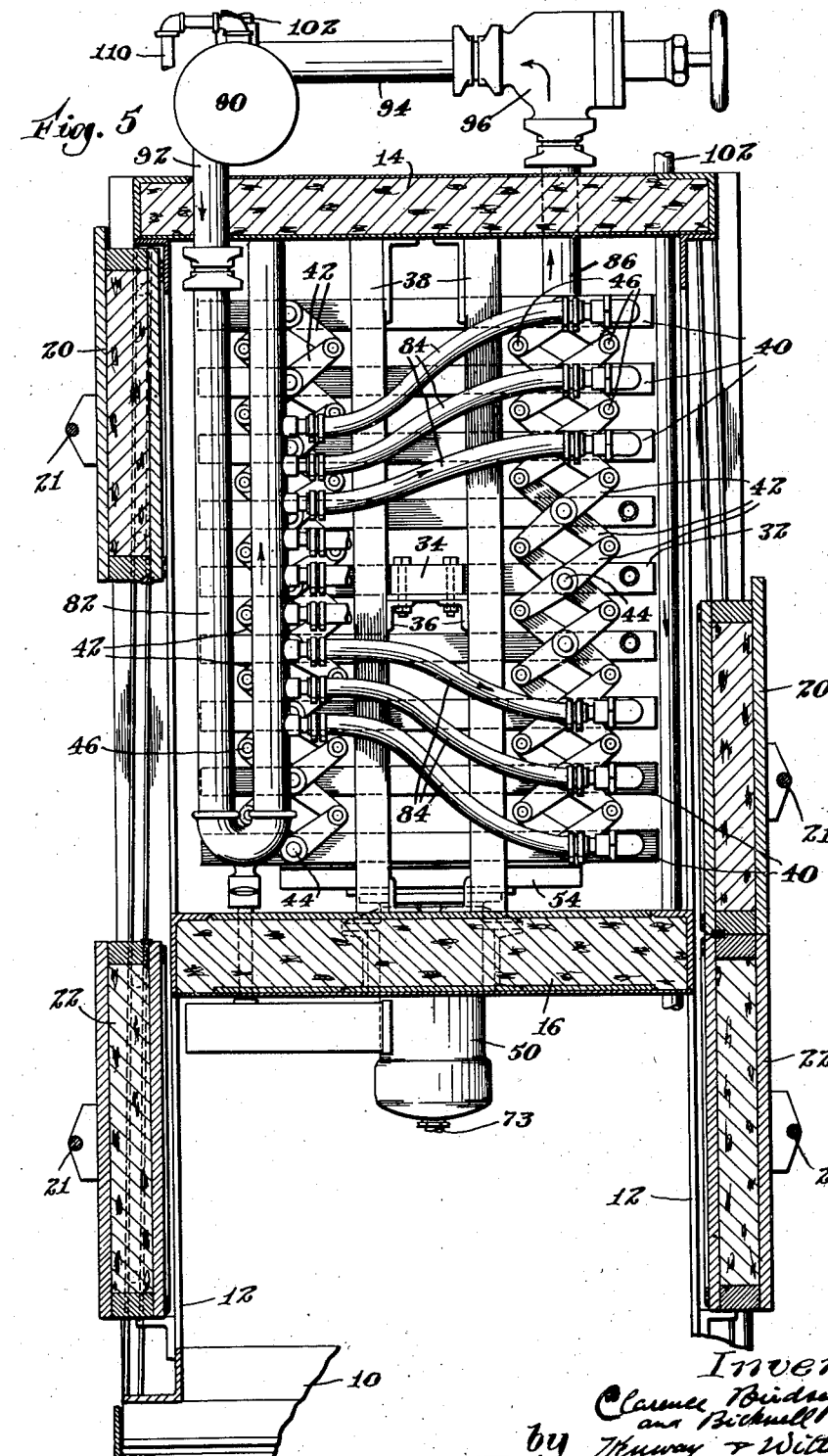

Patented Apr. 25, 1933                                              1,905,131

UNITED STATES PATENT OFFICE

CLARENCE BIRDSEYE AND BICKNELL HALL, OF GLOUCESTER, MASSACHUSETTS, ASSIGNORS TO FROSTED FOODS COMPANY, INC., OF DOVER, DELAWARE, A CORPORATION OF DELAWARE

REFRIGERATING APPARATUS

Application filed February 25, 1931. Serial No. 518,060.

This invention relates to refrigerating apparatus adapted for freezing, quick-freezing or chilling food products to any desired degree of congealation.

Food products are frozen most successfully between heat-conductive members which firmly engage the product upon opposite sides over a substantial area thereof, thus establishing intimate contact and ensuring uniform and rapid interchange of heat between product and the heat-conductive members. Among other desirable factors, it is important that the unfrozen product should be engaged with a measured degree of pressure between appropriate limits such that, on the one hand, the shape of the product in its package or container may be maintained without distortion by crushing, but on the other hand, it should be engaged with sufficient pressure to cause the expansion of the product in freezing to take place internally, closing the voids in the product and thus solidifying the mass thereof. Provision should also be made for supplying an ample quantity of cooling medium to the heat-conductive members at a relatively low temperature to maintain a pronounced temperature difference between the product and the surfaces engaging it, and thus ensure rapid heat interchange. The construction of the apparatus should also facilitate the presentation of the unfrozen product and the removal of the frozen product.

The present invention contemplates refrigeration apparatus embodying the desirable characteristics above discussed and others as will presently appear. In one aspect, accordingly, it comprises refrigeration apparatus in which rigid heat-conducting members are arranged for relative movement to engage between them food product in any desired form, such members being associated with means for supplying cooling medium thereto in all relative positions.

Our invention contemplates apparatus of large refrigerating capacity, so designed as to occupy a relatively small amount of floor space and being, therefore, adapted for installation in plants of medium size, on board vessels, or in any location where limited areas are available. We have discovered that the desired results may be achieved by providing a series of heat-conductive plates disposed in parallel relation and in substantial alignment and arranged to be contracted or expanded as a series. In the expanded position of the series, the product to be frozen may be delivered to the apparatus by presenting it at different levels between the spaced plates, whereupon the series may be contracted as a whole so that the plates engage and press the interleaved product. By supplying a cooling medium to the plates while the product is thus held, the product may be frozen by the absorption of heat from both sides simultaneously through the agency of the heat-conductive plates. Where the product is presented in units of approximately uniform size, as for example packaged in a carton, a relatively slight separating movement of the heat-conductive plates and expansion of the series as a whole is required to permit the insertion of the product and a corresponding slight contraction of the series is sufficient to subject the interleaved product to the desired pressure. It is practical, therefore, to employ a substantial number of heat-conductive plates in a stack or in vertical series without reaching a height in the least inconvenient for the presentation and removal of the product. It will be apparent that the refrigerating efficiency of apparatus constructed in this manner is favorably effected because each plate of the series, except the top and bottom plates, acts to refrigerate a product positioned in contact with both of its faces and each unit of product is cooled from opposite sides simultaneously.

The arrangement of heat-conductive plates and the construction of the mechanism for connecting and operating them will depend upon the requirements of the case. In apparatus employing many plates, power-operated mechanism has been found desirable for effecting the movement of the plates, while in smaller apparatus manually-operated mechanism has proved adequate. In the former case, the measured pressure required to compress the product to the proper degree may be automatically exerted and maintained and in the latter case the weight of the plates themselves or a portion thereof may be sufficient. In the embodiment of the invention herein shown, fluid pressure mechanism is utilized to move the plates and this presents the advantages of responding sensitively to the demands of the service in moving the plates quickly and smoothly to the desired positions of separation or desired pressure and in being well adapted to maintain automatically and without variation the desired condition of pressure upon the product.

It is within the scope of our invention to fix any plate or plates in the series and to move the remaining plates relatively thereto and to each other in engaging the product to be frozen. As herein shown, one of the intermediate plates of the series is fixed and those below and above it are moved with respect to it as a point of reference. This arrangement is desirable from the standpoint of economy of space and also in that it permits the apparatus as a whole to be substantially balanced, the weight of the plates which must be elevated compensating to some extent the weight of the plates which are moved downwardly in engaging or disengaging the product.

These and other features of the invention will be best understood and appreciated from the following description of a preferred embodiment selected for purposes of illustration and shown in the accompanying drawings, in which Fig. 1 is a view in front elevation of my improved apparatus with parts of the doors broken away to expose the interior;

Fig. 2 is a view in horizontal section taken on line 2—2 of Fig. 1;

Fig. 3 is a fragmentary sectional view on line 4—4 of Fig. 1;

Fig. 4 is a fragmentary plan view of the ram-controlling mechanism; and

Fig. 5 is a view in vertical section taken on line 5—5 of Fig. 2.

Figure 1:
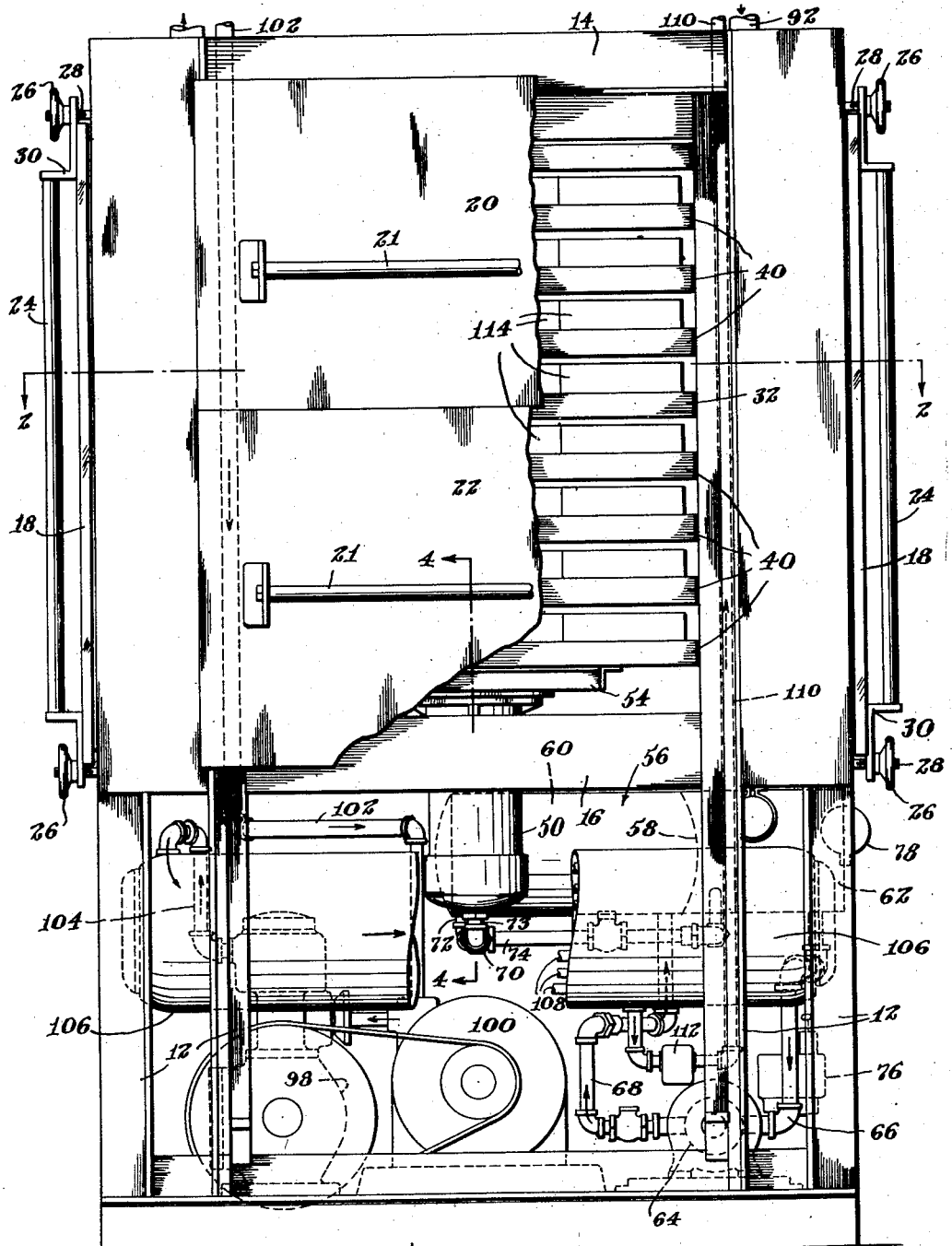

Referring directly to the accompanying drawings, we will now describe the specific form of our invention as herein illustrated. The entire apparatus is supported on and substantially within an angle iron frame comprising a base 10 and connected uprights 12, and may be considered as divided horizontally into two sections or parts, the upper section being an enclosed freezing unit and the lower section containing the operating and refrigerating mechanism therefor. The lower section may be left open, as shown, while the upper and freezing section is enclosed by top and bottom walls 14 and 16 and side walls which are formed by oppositely-disposed and removable panels 18, and two pairs of oppositely-disposed and sliding doors 20 and 22, it being understood that all these members are of insulating material and cooperate to provide a well insulated chamber. Each panel 18 is provided with a pair of vertically-disposed handles 24 and is held in closed position by hand wheels 26 threaded on studs 28 in the frame and engaging against flanged portions 30 of the panels. The doors 20 and 22 are independently slidable to any desired positions, as for example those shown in Figs. 1 and 5, may be counterweighted in the usual manner, and are provided with operating handles 21.

Within the housing of the upper section is provided a multiple series of heat-conductive plates, nine of such plates being herein illustrated. The middle plate 32 of the series if held stationary by means of a pair of ears 34 at opposite sides thereof which are respectively bolted to brackets 36 on two pairs of upright angle irons 38 forming a part of the frame. The plates 40 located above and below the stationary plate are connected to each other and to the stationary plate by a plurality of series of lazy tong levers 42, one series being located adjacent to each of the four corners of the plates. It will be noted that each pair of levers is pivoted together and to a plate by a stud 44 and that the free ends of each pair of levers are pivotally connected to the free ends of the next adjacent levers by studs 46. The effect of this mechanism is to maintain the plates at all times in parallel relation and to transmit movement and pressure from one to another plate in a progressive manner.

In the illustrated apparatus the system of heat-conductive plates is balanced as a whole and by such arrangement the power required for moving the plates in the operation of the apparatus is reduced to a minimum. To this end an equal number of movable plates 40 are located above and below the intermediate stationary plate 32 and, since the lazy tongs levers 42 act from the stationary plate as a point of reference, the four upper plates are moved always equally and oppositely with respect to the four lower plates. In the system as a whole, therefore, the action of gravity upon the plates is equalized.

The plates are shown in Figs. 1 and 5 as being located in their expanded or open position to receive the products and are adapted to be moved to the closed or pressure position by a suitable power means. The means which I have shown for this purpose comprises a fluid-pressure-operated ram 48 fitting within a cylinder 50 which is supported in the bottom wall 16 of the freezing chamber. The ram has a cap 52 and a packing ring at its lower end and a relatively broad support 54 on its upper end which is secured to the bottom plate 40 of the series. Fluid pressure within the cylinder is effective to elevate the ram 48 with the lowermost plate and, through the lazy tong connections, close the series of plates together, the plates 40 below the stationary plate 32 moving upwardly and the plates thereabove moving downwardly.

Oil or air under pressure for operating the ram is supplied by mechanism housed within the lower section of the apparatus and now to be described. A tank 56, divided by a vertical partition 58 into a pressure chamber 60 and a reservoir chamber 62, is suspended beneath the lower wall 16 of the upper section of the apparatus. A motor-operated pump 64 is connected to the reservoir by a pipe 66 and to the pressure chamber by an oppositely-extending pipe 68 and is adapted to draw fluid, such as oil, from the reservoir and force the same under pressure to the pressure chamber 60. The ram is controlled by a three-way valve 70, from which lead a connecting pipe 72 to the pressure chamber, a connecting pipe 74 to the reservoir, and a short connection 73 to the cylinder 50. In one position the valve 70 permits fluid under pressure from the pressure chamber 60 to enter the cylinder 50 and raise the ram, and in another position it permits the fluid in the cylinder 50 to escape through the pipe 74 into the reservoir and the ram to descend. A pressure regulator 76 is provided for automatically controlling the operation of the pump motor in such manner as to ensure that it will deliver and maintain the desired pressure in the pressure chamber 60, this regulator being adjustable for different pressures and being standard equipment. A pressure gage 78 may also be provided to indicate the pressure in the pressure chamber.

The individual plates 32 and 40 are substantially identical in construction and each comprises a metallic frame or shallow box having sinuous passages 80 therein, as shown in Fig. 2, for directing a cooling medium over its entire area. The passages 80 may be formed by casting suitable pipes in the plates, or by coring or other form of hollow construction. Fluid-cooling medium is supplied by a U-shaped pipe or header 82 which is located at the right side of the apparatus as seen in Fig. 2 and connected to each individual plate 40 by flexible tubes 84, permitting movement of the plates with reference to the header without interrupting the circulation of the cooling medium. Similarly, cooling medium is discharged through a vertical pipe or header 86 located at the left side of the apparatus and connected to the individual plates by flexible connections 88.

The apparatus herein shown is well adapted to be operated with calcium chloride brine or other cooling medium but we prefer to employ a medium operating by direct expansion, also to house the refrigerant-supplying mechanism within the lower section whereby the apparatus becomes a self-contained unit. We will now briefly describe a suitable mechanism for this purpose.

We prefer to use ammonia as the refrigerant and the main supply of ammonia, mostly in liquid form, is normally contained within the hollow plates and in a surge tank 90 mounted on the top of the apparatus. The supply header 82 is connected by a pipe 92 to the bottom of the tank 90, whereby liquid ammonia is supplied to the plates 32 and 40 therefrom and the discharge header 86 is connected by a pipe 94 to the top of the tank 90 whereby to deliver ammonia vapor thereto. A manually-operable valve 96 is provided in the pipe 94 for controlling defrosting operations of the plates by shutting off circulation of the ammonia, this valve, however, being open in the normal operation of the apparatus.

Housed within the lower section of the apparatus is a compressor 98 driven by a motor 100. A pipe 102 connects the suction port of the compressor to the surge tank 90 and a pipe 104 connects the compression port thereof to the top of a condenser tank 106. Within the condenser are a plurality of pipes or tubes 108 through which is circulated cold water for cooling and condensing the compressed ammonia vapor. The condensed ammonia is passed from the tank 106 to the surge tank by means of a pipe 110 extending from the bottom of the compressor tank. A float valve 112 at the lowermost point of this pipe automatically opens when it contains any liquid but remains closed when no liquid is present. It will be understood that a relatively high pressure is maintained in the tank 106 and that this liquid is, therefore, quickly blown through the opened valve to the surge tank expanding at reduced pressure. The condenser is thereby automatically kept substantially free of liquid ammonia.

The cycle of the refrigerating medium may be briefly described as follows. The plates 32 and 40 are kept supplied with liquid ammonia from the bottom of the surge tank 90 through the header 82. The compressor, through the connection 102, maintains a relatively low pressure in the surge tank 90 whereby, through the header 86 and connection 94, circulation and evaporation of ammonia are maintained within the plates. The compressor continuously draws the ammonia vapor from the tank 90 and compresses it and delivers it to the tank 106, where it is condensed and returned in liquid form to the tank 90.

In loading the apparatus, it is, of course, desirable to expose the refrigerating chamber as little as possible and the doors 20 and 22 are designed to aid in this operation. When loading the upper portion of the plates, the two doors are brought down to the position shown at the right-hand side of Fig. 5, and when loading the lower portion thereof the upper door 20 is moved upwardly to the position shown at the left-hand side of Fig.

5, the portion not being loaded being thereby protected from the atmosphere. The products are preferably loaded through one opening and discharged through the opposite opening.

The operation of the apparatus may be briefly described as follows. The valve 70 is turned to a position connecting the cylinder 50 with the reservoir 62, whereupon the plates 40 are moved to the separated position illustrated. The product to be frozen, as the packages 114, is then introduced through one doorway and arranged upon the upper surfaces of the plates, except the topmost plate. When the charging operation is completed, the doors are quickly closed and the valve 70 turned to the position connecting the cylinder with the pressure chamber 60. The ram is thereupon moved upwardly and the plates brought together to engage both sides of the product therebetween with a predetermined pressure, it being understood that this pressure is automatically maintained during the freezing operation.

The amount of time required for the freezing operation, of course, depends upon the condition of the product to be frozen and upon the temperature and quantity of the cooling medium circulated through the heat-conductive plates. In any case, however, the quick-freezing can be carried out simultaneously from both sides of the interleaved product and with a high degree of efficiency. After an interval sufficient for the freezing operation, the valve 70 is turned to its releasing position, whereupon the plates move to the separated position, thus releasing the frozen product from pressure. The doors at both sides are then opened and the frozen product may be pushed through between the plates from one side or the other and removed for storage or shipment.

We desire to call particular attention to the arrangement and connection of the heat-conductive plates whereby they are always maintained parallel while transmitting pressure from one to another, and more especially the arrangement embodying an intermediate stationary plate, whereby we are able to double the capacity of the apparatus without increasing the stroke of the ram or other power means. Also the general arrangement of the apparatus is such as to provide a self-contained unit for greater convenience of use and operation. Furthermore, while the heat-conductive plates herein shown are horizontally arranged, they may be positioned in accordance with the requirements of the particular product to be treated. For example, in quick-freezing liquid or semi-liquid products, it may be desirable to dispose them vertically. It will also be understood that the mechanism for connecting and moving the heat-conductive plates may be modified so long as the plates are maintained parallel and substantially equally spaced.

Having thus described our invention, what we claim as new and desire to secure by Letters Patent is:

1. A refrigerating apparatus comprising a series of substantially horizontal heat-conductive plates movably disposed in substantially vertical alignment and adapted to receive thereon and therebetween products to be frozen, means for so connecting said plates as to maintain them equally spaced from each other, means for simultaneously varying the spacing thereof, and means for supplying cooling medium to the plates.

2. A refrigerating apparatus comprising a series of similar heat-conductive plates movably disposed in alignment and maintained at all times in parallel relation, links connecting said plates at opposite sides, maintaining them equally spaced at all times regardless of the extent of their separation and leaving the ends of the plates free and clear for the passage of the product to be refrigerated, and means for supplying cooling medium to said plates.

3. A refrigerating apparatus comprising a stationary heat-conductive plate, a similar plate disposed in opposition thereto, means for moving said latter plate toward or from the stationary plate, a series of spaced interposed plates all connected to said movable plate and movable simultaneously therewith in graduated proportion, and means for supplying cooling medium to said plates.

4. A refrigerating apparatus comprising a refrigerating chamber having a door in one side, a heat-conductive plate fixed in the chamber, a multiple series of plates located above said fixed plate, connections to the plates governing the spacing thereof and located out of line with said door, and means for supplying cooling medium to the plates in all spaced positions thereof.

5. A refrigerating apparatus comprising a multiple series of substantially horizontal heat-conductive plates maintained at all times in spaced relation and having opposite edges free and unobstructed, whereby product to be refrigerated may be interleaved between the plates, a frame including members at the corners of the plates for holding the series of plates in substantially vertical alignment, means for varying the spacing of the plates constructed and arranged adjustably to limit the pressure upon the interleaved product, and means for delivering a cooling medium to said plates.

6. Refrigeration apparatus for food products, comprising cooperating series of hollow heat-conductive plates arranged for relative movement to receive and press between them a product to be frozen, mechanical means acting on the plates to insure a parallel relation therebetween when the plates are in the product-freezing position, and means for supplying cooling medium to the interior of said plates in all positions.

7. Refrigeration apparatus for food products, comprising a stack of substantially horizontal and cooperating hollow heat-conductive plates arranged for relative movement to receive thereon and press therebetween a product to be refrigerated, and means for circulating cooling medium through said plates.

8. Refrigeration apparatus for food products, comprising a stationary supporting plate, and a plurality of vertically-movable heat-conductive plates arranged to be raised and lowered above the supporting plate, whereby each plate may be pressed against a product supported by the plate below, said plates being hollow for the passage of a refrigerating medium, and means for circulating a refrigerating medium through said plates during the freezing operation and regardless of the position of the plates, whereby the products engaged between said plates will be frozen.

9. Refrigeration apparatus for food products, comprising a hollow heat-conductive plate for supporting the product to be frozen, connections for circulating a refrigerating medium through said plate, a series of cooperating hollow heat-conductive plates movable vertically above said stationary plate for engaging the product thereon and between each other, stationary inlet and outlet pipes for the movable plates, and flexible connections between said pipes respectively and the movable plates.

10. Refrigeration apparatus for food products, comprising a stack of substantially horizontal cooperating heat-conductive plates mounted and maintained in substantially vertical alignment with each other and having passages therein, means for initially supporting the plates in spaced relation to receive products therebetween at different levels and independent refrigerating connections communicating with the passages of the respective plates and arranged to permit the relative movement thereof.

11. A refrigerating apparatus comprising a refrigerating chamber having a door in one side, a stack of substantially horizontal and cooperating heat-conducting supports arranged therein for relative movement to receive at different levels and press therebetween products to be refrigerated, means whereby the supports can be separated for receiving said products, and means for circulating a cooling medium through said supports.

12. A food refrigerating apparatus comprising a multiple series of plates, means for relatively separating said plates to receive between them at different levels products to be frozen, means for adjusting the spaced relation of adjacent plates to engage the products therebetween with any desired degree of pressure, and means for freezing such products while so engaged between the plates.

13. A refrigerating apparatus comprising a plurality of hollow heat-conductive plates arranged in face to face relation and adapted to receive therebetween food products to be frozen, mechanically-actuated means to move the plates together to engage both sides of the products between them and exert any desired pressure thereon, and means for supplying a refrigerating medium to said plates for freezing the products while so engaged between them.

14. A refrigerating apparatus comprising a plurality of chambered heat-conductive plates arranged in face to face relation and adapted to receive therebetween food products to be frozen, means connecting and maintaining the plates at all times in parallel relation arranged to transmit movement from one to another plate, mechanical means to move the plates together and engage both sides of the products between them and exert a predetermined pressure thereon, and means for supplying a refrigerating medium to said plates for freezing the products while so engaged between them.

15. A refrigerating apparatus comprising cooperating hollow heat-conductive plates disposed in face to face relation and adapted to receive between them food products to be frozen, means for relatively moving the plates together for exerting any desired pressure upon the interposed product and for automatically maintaining said pressure, and means for refrigerating said plates to freeze the products while so maintained under pressure.

16. A refrigerating apparatus comprising a stationary horizontally-disposed presser plate, a hollow heat-conductive plate movably mounted beneath said presser plate and arranged to receive upon its upper face food products to be refrigerated, power-operated means for elevating said heat-conductive plate to engage the product against said stationary plate, and means for delivering a refrigerating medium to the movable plate to freeze the product while so engaged.

17. A refrigerating apparatus comprising a series of chambered heat-conductive plates arranged in horizontal position one above another, the uppermost plate being stationary and those below it being arranged to receive food products to be frozen, mechanically-operated means for moving all of the product-receiving plates upwardly to engage the products with a predetermined pressure against the under face of the next adjacent plate, and means for delivering a refrigerating medium to the plates to freeze the products while so engaged.

18. A refrigerating apparatus comprising a series of chambered heat-conductive plates disposed horizontally one above another and adapted to receive between them food products to be frozen, a series of levers connected to the plates at symmetrically located points for transmitting movement from one to another, mechanically-actuated mechanism for moving one of said plates and through said levers the other plates to exert any desired pressure upon the interposed product, and means for refrigerating said plates.

19. A refrigerating apparatus comprising a plurality of hollow heat-conductive plates arranged in face to face relation and adapted to receive therebetween products to be frozen, a series of lazy-tongs levers connected to the plates adjacent to each corner for maintaining them in parallel relation and transmitting movement thereto, mechanically-operated means to move the plates together through said levers to engage with a predetermined pressure both sides of the products, and means for supplying a refrigerating medium to said plates for freezing the products while so engaged between them.

20. A refrigerating apparatus comprising a plurality of hollow heat-conductive plates arranged in face to face alignment one above another and adapted to receive therebetween food products to be frozen, means connecting and holding the plates in parallel relation, a fluid-operated ram associated with the bottom plate and acting to move the plates together to engage both sides of the products between adjacent plates and exert any desired pressure thereon, and means for delivering a refrigerating medium to the plate for freezing the products while so engaged between them.

21. A refrigerating apparatus comprising a plurality of heat-conductive plates arranged in face to face relation and adapted to receive therebetween products to be frozen, means holding one of the intermediate plates stationary, mechanically-operated means for simultaneously moving the plates together to engage both sides of the products and exert any desired pressure thereon, and means for delivering a refrigerating medium to the plates for freezing the products while so engaged between them.

22. A refrigerating apparatus comprising a series of heat-conductive plates arranged in face to face relation and adapted to receive therebetween food products to be frozen, means connecting and holding the plates in parallel relation, means holding one of the intermediate plates stationary, mechanically-operated means engaging one of the end plates of the series and operative thereon and through the said connecting means to move the plates together to engage both sides of the products and exert any desired pressure thereon, and means for delivering a refrigerating medium to the plates for freezing the products while so engaged between them.

23. A refrigerating apparatus comprising a series of heat-conductive plates arranged in face to face relation one above another and adapted to receive therebetween food products to be frozen, a heat-insulating housing enclosing the plates and having opposed openings on opposite sides thereof, and a pair of doors covering each opening and being independently movable to different relative positions to expose different plates of the series.

24. A refrigerating apparatus comprising a plurality of heat-conductive plates arranged in face to face relation one above another and adapted to receive therebetween food products to be frozen, a heat-insulating housing enclosing the plates and having an opening in one side, and a pair of doors covering the opening and slidably mounted to permit movement of one door to expose selected plates of the series and to permit movement of both doors to expose other plates of the series.

25. A self-contained refrigerating apparatus comprising a rectangular frame, a heat-insulating housing supported thereby, a plurality of hollow heat-conductive plates arranged in face to face relation one above another within the housing and adapted to receive therebetween food products to be frozen, power-operated means located within the frame and beneath the housing for moving the plates together and engaging with a predetermined pressure both sides of the products with opposed and parallel faces of the plates, and means also located within the frame and beneath the housing for supplying refrigerating medium to the plates to freeze the products while so engaged between them.

26. A refrigerating apparatus comprising two series of heat-conductive plates movably supported for movement in opposite directions, adapted to receive therebetween food products to be frozen and connected substantially to balance each other, and power-operated means for moving the plates of both series equally and oppositely to engage and disengage the interposed product.

27. A refrigerating apparatus comprising a fixed horizontally-disposed intermediate plate, a series of heat-conductive plates movably supported above and below said intermediate plate and adapted to receive therebetween food products to be frozen, mechanically-operated means for moving said heat-conductive plates toward the intermediate plate to exert pressure upon the product, and connections whereby the weight of the upper plates is rendered effective to compensate for that of the lower plates in such movement.

28. Refrigerating apparatus for food products, comprising a stack of substantially horizontal and cooperating heat-conductive plates with internal passages therein for refrigerating medium, a plurality of said plates being arranged for relative movement to apply substantially equal pressure to products interposed at different levels between them, and means for circulating a cooling medium through the plates while they occupy their positions of pressure.

29. A refrigerating apparatus comprising cooperating heat-conductive plates having refrigerating connections and being disposed in face to face relation to receive between them food products to be frozen, means for relatively moving the plates together for exerting any desired pressure upon the interposed product and including a source of fluid pressure and a pressure regulator, whereby a uniform pressure may be continuously maintained on the product, and means for refrigerating the plates to freeze the product while engaged upon opposite sides by the plates.

30. A refrigerating apparatus comprising as a self-contained outfit, a frame having a heat-insulating chamber therein, a plurality of horizontal heat-conductive plates mounted in the chamber in alignment with each other and having refrigerating connections, power-operated mechanism mounted in the frame for relatively moving certain of the plates to receive and compress products presented between them, and power-operated mechanism for maintaining a circulation of refrigerating medium through said plates.

CLARENCE BIRDSEYE.
BICKNELL HALL.